Jan. 17, 1961  D. G. NOBLETTE  2,968,511
BOAT LOADING DEVICE

Filed Oct. 21, 1959  2 Sheets-Sheet 1

*INVENTOR.*
DUFFIELD G. NOBLETTE
*BY*
MAHONEY, MILLER & RAMBO, ATTY'S
BY

Jan. 17, 1961  D. G. NOBLETTE  2,968,511
BOAT LOADING DEVICE

Filed Oct. 21, 1959  2 Sheets-Sheet 2

INVENTOR.
DUFFIELD G. NOBLETTE
BY
MAHONEY, MILLER & RAMBO, ATTY'S.
BY

United States Patent Office 2,968,511
Patented Jan. 17, 1961

2,968,511
BOAT LOADING DEVICE
Duffield B. Noblette, 1477 Elmore Ave.,
Columbus 24, Ohio
Filed Oct. 21, 1959, Ser. No. 847,719
3 Claims. (Cl. 294—82)

My invention relates to a boat loading device. It has to do, more particularly, with a boat-manipulating device or tool for use in loading a floating boat on a trailer while submerged. It is especially useful in loading a small boat on a trailer so as to remove the boat from the water and take it to a different location.

It is well known that to remove a small boat from the water and to transport it to a new location, it is customary to back the trailer into the water and to maneuver the bow of the floating boat over the submerged rear end of the trailer. The boat is usually pulled onto the trailer by means of a winch and cable on the trailer, the cable being hooked on the bow. This sometimes is difficult since if the cable is merely hooked to the bow of the boat, the boat will swing with the wind and often it is difficult to align it with the trailer and center it with the usual support rollers or guides thereon.

According to my invention, I provide a simple inexpensive tool which can be engaged with the bow of the boat and to which the cable of the winch on a trailer can be attached, so that it can be used to obtain desirable leverage in manipulating the bow of the boat to center it relative to the trailer as it is pulled thereon by the cable and winch.

Various other objects will be apparent.

In the accompanying drawings, I have illustrated the structure of my boat loading tool and the manner of using it.

Figure 1:
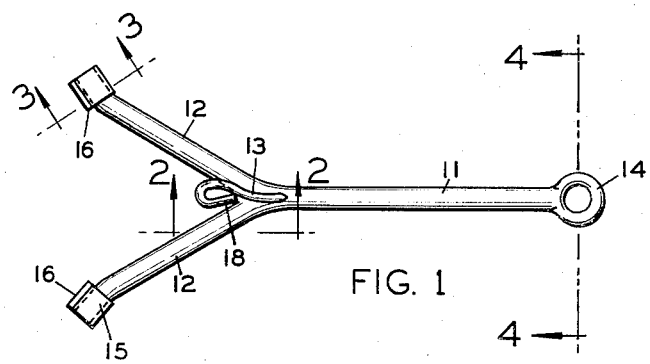
Figure 1 is a plan view of the tool.
Figure 2:
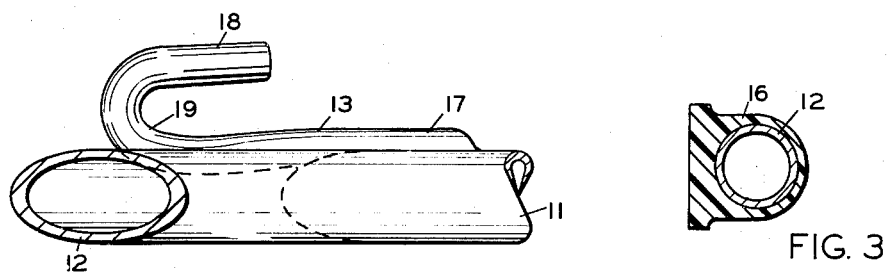
Figure 2 is an enlarged sectional view taken along line 2—2 of Figure 1.
Figure 3:
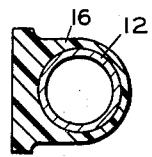
Figure 3 is an enlarged sectional view taken along line 3—3 of Figure 1.
Figure 4:
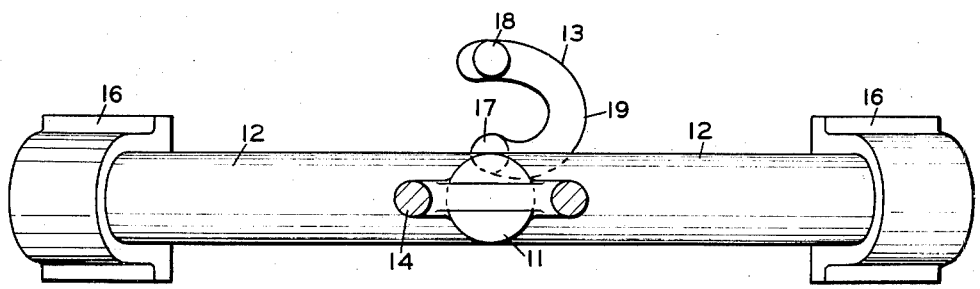
Figure 4 is an enlarged sectional view taken along line 4—4 of Figure 1.

With reference to the drawings, in Figures 1 to 4, inclusive, I have illustrated the detailed structure of my tool. It is made in the form of a Y-shaped arm or lever which includes the elongated manipulating tongue 11 having the diverging boat-engaging arms 12 at one end thereof. At the vertex between these arms 12 is a hook 13 of special form. The forward end of the tongue is provided with a hook-receiving eye 14. The rear or outer ends of the arms 12 are bent outwardly, as indicated at 15, and receive cushion members 16 of suitable yieldable material such as rubber. The Y-shaped member including the tongue 11 and arms 12 are preferably made of tubular metal stock such as steel pipe. The hook 13 is preferably of steel and is welded or otherwise secured to the tongue 11 and projects rearwardly over the vertex between the arms 12.

As indicated, the hook 13 is of special form comprising a shank 17 which extends longitudinally of the tongue 11 and the axis of which is in the same plane as the axis of the tongue. The shank extends rearwardly beyond the vertex of the arms 12 and then upwardly and is turned forwardly to provide an elongated end portion 18. This end portion 18 extends longitudinally of the tongue and has its axis in the same plane as the axis of the portion 17 and the axis of the tongue 11. The portions 17 and 18 of the hook are parallel and are joined by a curved portion 19 and, as indicated best in Figure 4, this portion 19 extends from the portion 17 laterally outwardly from the plane of the axis of the tongue 11 and then inwardly to its connection to the end portion 18.

Figure 6:
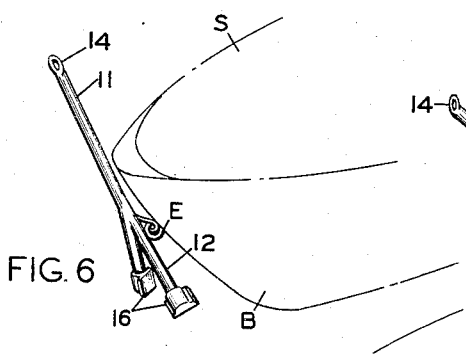
Figure 6 is a view similar to Figure 5 showing the next step in positioning the tool on the bow of the boat.
Figure 5:
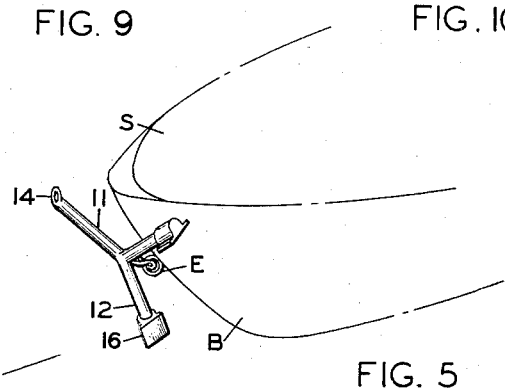
Figure 5 is a diagrammatic view showing a first step in hooking the tool on the bow of the boat.
Figure 7:
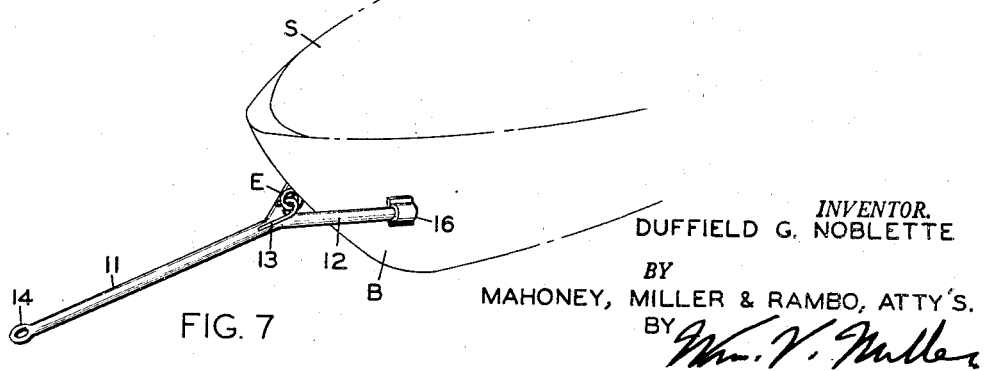
Figure 7 is a similar view showing the final positioning of the tool on the bow of the boat.

In the use of this tool, it is applied to the bottom of the boat B, as indicated in Figures 5 to 7. Boats of this type are usually provided with an eye E which is at the prow of the boat at a point spaced below the upper deck surface S thereof. This eye E is in a vertical plane and opens laterally. To apply the tool, the first step is to support the tool crosswise of the bow and slip the end portion 18 of the hook laterally through the eye E, as shown in Figure 5. Then, as shown in Figure 6, the tool is swung vertically, the curved portion 19 of the hook permitting this. Finally, as shown in Figure 7, it is swung downwardly, the curved portion 19 permitting this pivoting also, until the arms 12 straddle the bow and the cushion members 16 are in engagement with the side surfaces thereof. The outturned ends 15 prevent the ends from gouging into the bow surfaces.

Figure 8:
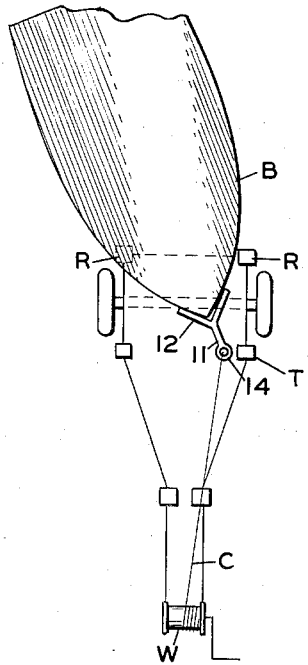
Figure 8 is a diagrammatic view showing the tool on the boat being used in the initial step of centering the boat with the trailer.
Figure 9:
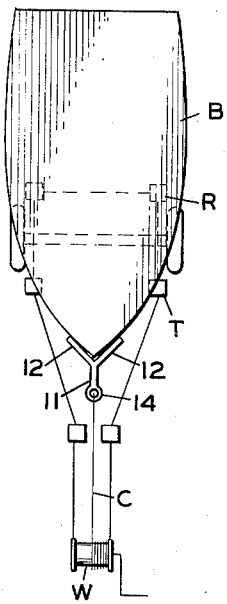
Figure 9 is a similar view showing the centered boat being pulled onto the trailer.
Figure 10:
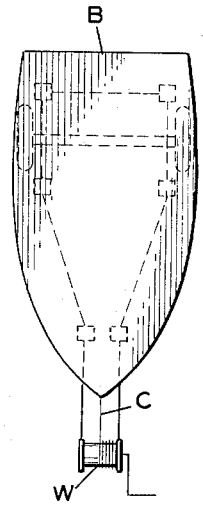
Figure 10 is a similar view showing the boat finally positioned on the trailer.

Assuming the boat is floating and the trailer T shown in Figures 8 to 10, inclusive, is submerged, the tool is used as indicated in such figures. The boat is moved up until the bow at one side engages a guide roller or other guide member R of the trailer. For example, the boat may be at the angle indicated in Figure 8, parallel to the trailer T. The tool may be used as a lever for swinging the boat into centered relationship about the engaging point on the trailer to the position shown in Figure 9. At this time, the boat will engage the guides or supports R on the trailer at the opposite sides. It will be understood that at this time also the cable C of the winch W on the trailer will be connected to the eye 14 of the tool. The winch may be used to haul the boat onto the trailer to the final position shown in Figure 10, but for the final movement of the boat, the tool may be removed and the cable can be attached directly to the eye E on the boat.

It will be apparent that I have provided a tool of Y-form which has a hook of special form and which is located at the vertex of the Y so that the hook can be readily engaged with the eye on the bow of the boat and the diverging arms of the Y can eventually engage the side surfaces thereof. The tongue of the Y-shaped arm extends forwardly from the bow of the boat and provides sufficient leverage for manipulating the bow of the boat into a centered position in engagement with the guides or rollers on the trailer.

Various other advantages will be apparent.

Having thus described my invention, what I claim is:

1. A boat manipulating hook comprising a tongue having at one end thereof arms which extend in diverging directions from a vertex in a common plane for engaging the bow of a boat, a hook disposed at the said vertex and extending over the vertex between said arms for engaging an eye on the bow of a boat which is in a vertical plane and opens laterally, said hook being disposed at the axis of the tongue and having an outer end portion extending in a direction opposite to the directions in which said arms extend in the plane of the axis of the tongue which is normal to the plane of the arms and is spaced outwardly from the plane of the arms and a laterally curved offset portion extending laterally outwardly from said plane of said axis and connecting said tongue and said outer end portion of the hook, said curved portion extending over the vertex between said arms.

2. A tool according to claim 1 in which the hook has a shank portion secured to the tongue and is in the same plane with said outer end portion and the axis of the tongue, said outer end portion and said shank portion being joined by the laterally curved portion, said shank and outer end portion extending in the same direction and being parallel.

3. A boat manipulating tool according to claim 2 which is of Y-form having the hook at the vertex of the arms of the Y.

References Cited in the file of this patent

UNITED STATES PATENTS

| | | |
|---|---|---|
| 1,472,262 | Abildgaard | Oct. 30, 1923 |
| 1,729,276 | Ohlsen | Sept. 24, 1929 |
| 2,522,616 | Husek | Sept. 19, 1950 |
| 2,635,891 | Cook | Apr. 21, 1953 |

FOREIGN PATENTS

| | | |
|---|---|---|
| 1,001,001 | Germany | Aug. 21, 1958 |